United States Patent
Boran et al.

(10) Patent No.: US 6,597,181 B2
(45) Date of Patent: Jul. 22, 2003

(54) HIGH AND LOW SIDE DRIVER TESTS FOR AIRBAG MODULE

(75) Inventors: Colm Peter Boran, Novi, MI (US); Paul Douglas Bingham, Canton, MI (US); Steven John Bigham, Canton, MI (US); David Matthew Mantey, Canton, MI (US)

(73) Assignee: Autoliv ASP, Inc., Ogden, UT (US)

( * ) Notice: Subject to any disclaimer, the term of this patent is extended or adjusted under 35 U.S.C. 154(b) by 62 days.

(21) Appl. No.: 09/999,742

(22) Filed: Oct. 31, 2001

(65) Prior Publication Data

US 2002/0050826 A1 May 2, 2002

Related U.S. Application Data

(60) Provisional application No. 60/244,683, filed on Oct. 31, 2000.

(51) Int. Cl.$^7$ .............................................. G01R 27/14
(52) U.S. Cl. .................. 324/525; 340/438; 324/525; 324/537; 324/712; 324/713; 324/158.1
(58) Field of Search .................. 340/438; 324/711, 324/713, 691, 712, 158.1, 525, 511, 512, 537

(56) References Cited

U.S. PATENT DOCUMENTS

| | | | | |
|---|---|---|---|---|
| 4,825,148 A | * | 4/1989 | McCurdy et al. | 324/720 |
| 4,990,884 A | * | 2/1991 | McCurdy et al. | 340/438 |
| 5,187,465 A | * | 2/1993 | Stonerook et al. | 340/438 |

OTHER PUBLICATIONS

Infineon Technologies, *Dual Firing Airbac IC Data Sheet*, Ver. 1.61, Nov., 2000.

* cited by examiner

*Primary Examiner*—N. Le
*Assistant Examiner*—Vincent Q. Nguyen
(74) *Attorney, Agent, or Firm*—Brinks Hofer Gilson & Lione; Sally J. Brown; James D. Erickson

(57) ABSTRACT

A method of testing a high-side driver and a low-side driver in an airbag squib circuit includes preliminary testing of squib resistance and squib leakage for a plurality of trials. Next, one of the drivers is turned on while keeping the other one of the drivers off. A current-limited power supply supplies an intermediate voltage to a squib terminal and the voltage at the terminal is continuously compared with a predetermined voltage range which includes the intermediate voltage. The one driver is turned off in response to the voltage at the point being outside the predetermined voltage range, thereby detecting that the one driver is operating properly. If the voltage at the point remains in the predetermined voltage range for a predetermined time period, then the one driver is turned off and an indication is made that the one driver has failed. If the first driver passed, then the other driver is tested in the same manner.

12 Claims, 4 Drawing Sheets

HIGH AND LOW SIDE DRIVER TESTS FOR AIRBAG MODULE

This application claims the benefit of Provisional application Ser. No 60/244,683, filed Oct. 31, 2000.

BACKGROUND OF THE INVENTION

The present invention relates in general to circuits for deploying airbag igniters or squibs, and, more specifically, to circuit diagnostics for testing proper operation of drivers that supply electrical energy to ignite the squibs.

The main components of an airbag supplemental restraint system used in motor vehicles include an inflatable bag, a propellant source (e.g., sodium azide pellets), an igniter or squib to initiate burning of the propellant source, at least one crash sensor, and an electronic control module for determining when to deploy an airbag and sending a deployment pulse to the igniter. The airbag, propellant, and igniter are contained in an airbag module (e.g., within a steering wheel for a driver airbag). The sensor can be packaged separately or can be contained within the electronic control module.

The control module performs self-diagnostic monitoring of the supplemental restraint system each time the system is turned on (e.g., every time a vehicle is started). Any potential performance problems are identified and a warning light is illuminated so that the driver knows that the system needs to be serviced.

It is known to perform diagnostic monitoring of the electrical connection of the squib elements, squib resistances, and electrical leakage in the squib circuits, among other tests. When performing electrical testing involving the squibs, care must be taken to avoid application of any current to a squib that could cause inadvertent deployment of the airbag. Due to the cost of replacing an airbag module and the loss of supplemental protection until replacement occurs, diagnostic monitoring should not increase the chances of inadvertent deployment.

A very desirable test to be able to perform is a driver test in which a squib driver circuit can be activated in a test mode without igniting the squib. Such a test can verify that a semiconductor switch in series with the squib element itself will conduct as intended during an actual deployment event. However, such a test has been problematic since the activation of the switch partially completes the deployment circuit. If certain other faults exist, or if switch activation is not implemented properly, unintended deployments can occur.

SUMMARY OF THE INVENTION

The present invention has the advantage that high-side and low-side drivers in series with a squib element can be tested while avoiding inadvertent airbag deployment.

In one aspect, the present invention provides a method of testing a high-side driver and a low-side driver in an airbag squib circuit. The airbag squib circuit includes a squib element coupled between the high-side driver and the low-side driver. The high-side driver controllably provides a high-side voltage to one side of the squib element and the low-side driver controllably provides a low-side voltage to the other side of the squib element. A resistance of the squib element is tested for a resistance value within a predetermined resistance range. A current leakage associated with said squib element is tested to determine whether it is over a leakage threshold. An intermediate voltage from a weak power supply is supplied to a point in the airbag squib circuit between the high-side driver and the low-side driver. One of the drivers is turned on while keeping the other one of the drivers off. A voltage at the point is continuously compared with a predetermined voltage range which includes the intermediate voltage. The one driver is turned off in response to the voltage at the point being outside the predetermined voltage range, thereby detecting that the one driver is operating properly. If the voltage at the point remains in the predetermined voltage range for a predetermined time period, then the one driver is turned off and an indication is made that the one driver has failed.

Unless there is a failure, the other driver is then turned on while keeping the one driver off. A voltage at the point is continuously compared with the predetermined voltage range. The other driver is turned off in response to the voltage at the point being outside the predetermined voltage range, thereby detecting that the other driver is operating properly. If the voltage at the point remains in the predetermined voltage range for the predetermined time period, then the other driver is turned off and an indication is made that the other driver has failed.

DETAILED DESCRIPTION OF PREFERRED EMBODIMENTS

Figure 1:
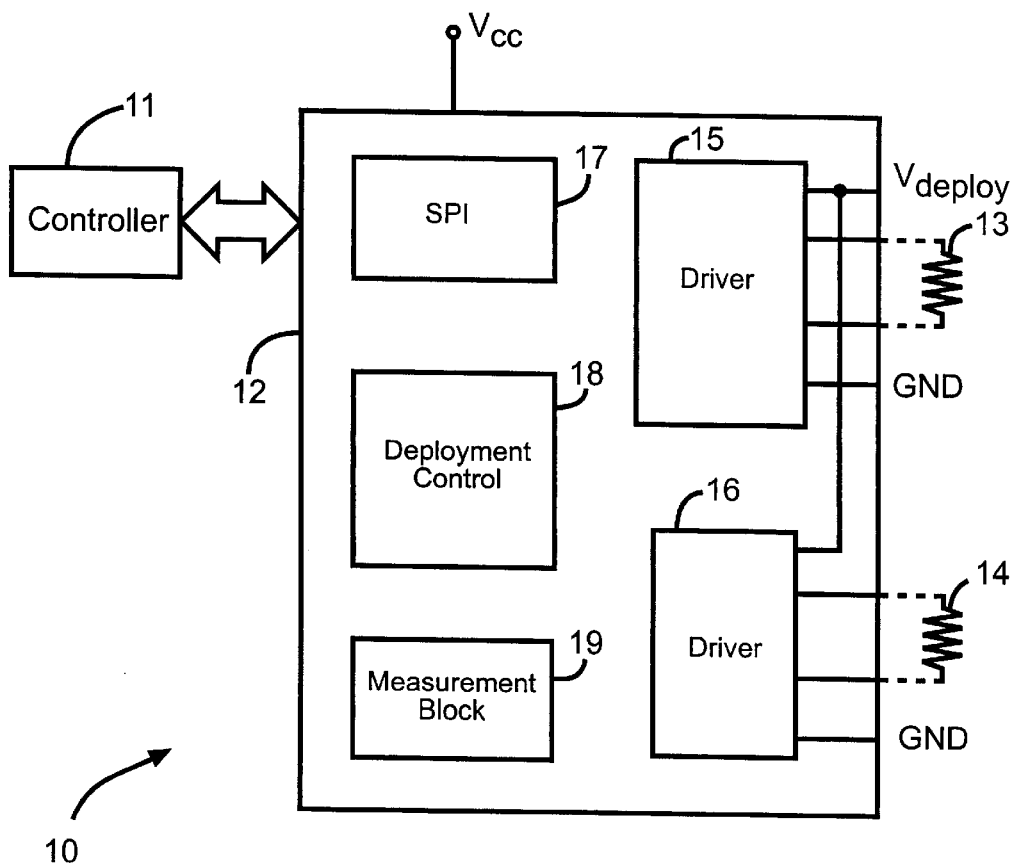
FIG. 1 is a block diagram showing an electronic controller and integrated circuit for an airbag supplemental restraint system.

Referring to FIG. 1, a control module 10 includes a microcontroller 11 coupled to an airbag firing application-specific integrated circuit (ASIC) 12. ASIC 12 is connected to a pair of remote squib elements 13 and 14 through appropriate vehicle wiring. Microcontroller 11 is connected to a crash sensor (not shown) such as an accelerometer to determine when a particular crash condition is occurring in which an airbag should deploy. ASIC 12 can be comprised of a TLE6712 Dual Firing Airbag IC available from Infineon Technologies AG of Munich, Germany, for example.

Each squib element is connected in a respective deployment loop comprising a driver circuit for providing an igniting pulse to its respective squib in response to an appropriate command from microcontroller 11. A two loop ASIC is shown in FIG. 1, although the present invention can be used advantageously with any number of loops. A first loop for squib element 13 includes a supply of a deployment voltage $V_{deploy}$, a first driver 15, and a connection to ground GND. A second loop for squib element 14 includes a connection to $V_{deploy}$, a second driver 16, and a connection to ground GND. $V_{deploy}$ may be a direct connection to a high capacity supply, such as a vehicle storage battery $V_{batt}$ or a source of stepped up battery voltage, to ensure sufficient energy for a deployment event. ASIC 12 also receives a regulated voltage $V_{cc}$ for supplying power (e.g., 5 volts) to on-chip components.

ASIC 12 further includes a serial peripheral interface (SPI) block 17 for receiving and decoding commands from microcontroller 11. The commands include a deployment command for each loop, and measurement and self-diagnostic test commands, for example. Deployment control block 18 includes logic to control the proper sequence of events to ignite a squib element via the driver(s) 15 and 16. Measurement block 19 performs various diagnostic measurements, such as squib resistance measurements as known in the art.

Figure 2:
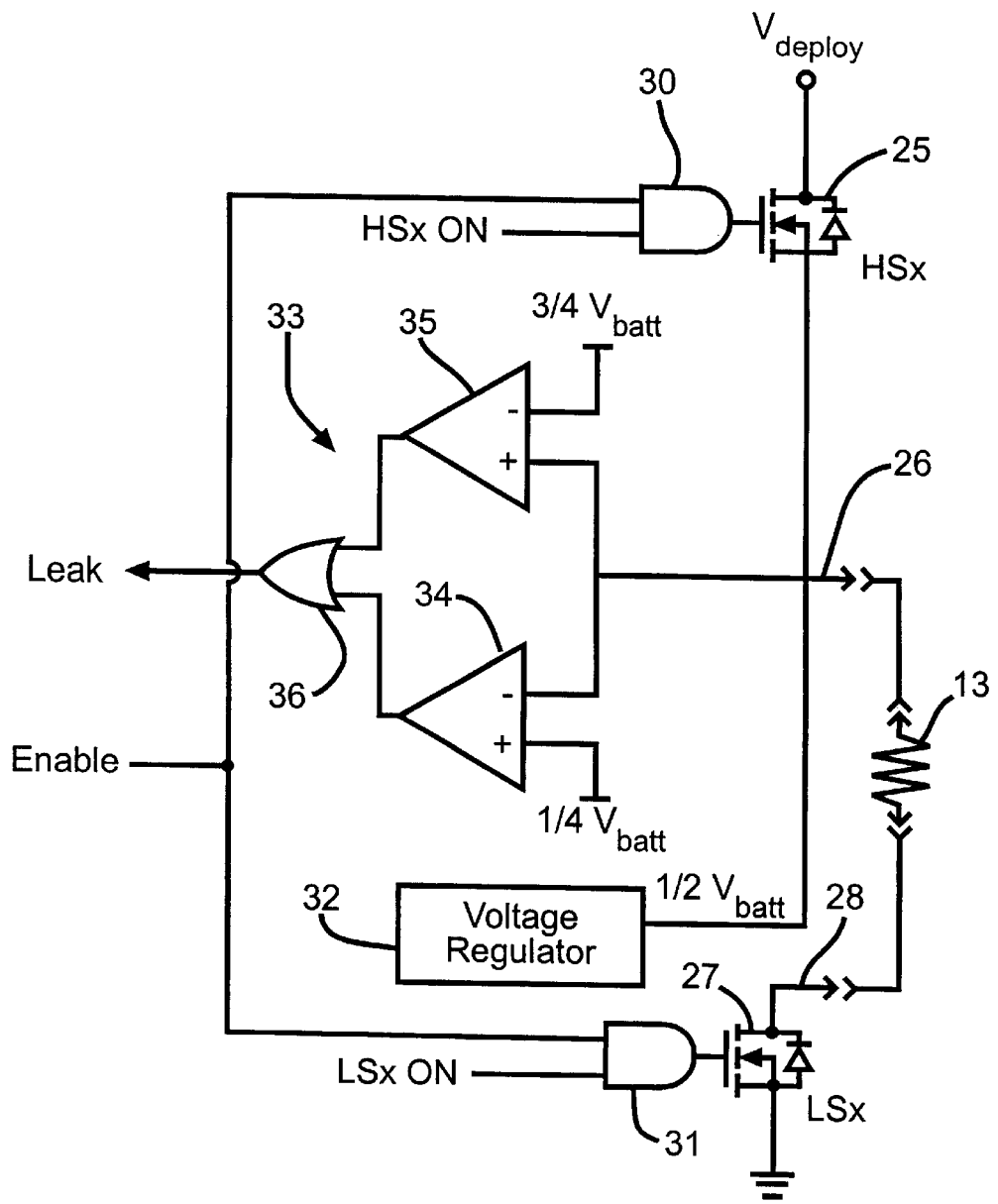
FIG. 2 is a schematic diagram showing apparatus for performing the high-side and low-side driver tests of the present invention.

Each driver within a deployment loop comprises a high-side and a low-side semiconductor switch as shown in FIG. 2 such that both switches must be turned on in order to complete an igniting circuit through the squib element. FIG. 2 shows only one deployment loop, although the invention is applicable to any number of deployment loops. In this one deployment loop, a MOSFET 25 has one output connected to a power supply terminal $V_{deploy}$ and its other output connected to a first squib terminal 26. A MOSFET 27 has one output connected to ground and its other output connected to a second squib terminal 28. Squib terminals 26 and 28 are connected to squib element 13 by a vehicle wiring harness and connectors.

The gate terminal (i.e., input) of MOSFET 25 is connected to the output of an AND-function 30 and the gate terminal of MOSFET 27 is connected to the output of an AND-function 31. Each AND-function has one input connected to receive an Enable signal, which may be provided as a separate control signal from the microcontroller, for example. A second input of AND-function 30 receives a "high-side switch on" signal (HSx ON signal), which may be provided in response to a corresponding SPI command from the microcontroller, for example. A second input of AND-function 31 receives a "low-side switch on" signal (LSx ON signal). The "x" in HSx ON and LSx ON is an index to refer to each deployment loop in the ASIC. The Enable signal and the HSx ON and LSx ON signals must have a high logic level in order to turn on each respective MOSFET.

Not shown in FIG. 2 is the conventional circuitry within measurement block 19 of FIG. 1 which performs squib resistance measurements. This circuitry is also connected to squib terminals 26 and 28 and it typically is comprised of a self-calibrating circuit that measures a voltage drop across a squib element. A normal resistance for a squib element is typically about 2 ohms. A resistance measurement greater than about 4 ohms or less than about 1 ohm usually indicates a fault in the squib element. Ignition of a typical squib element requires about 1 amp of current in an ignition pulse. Resistance testing is typically performed using about 50 milliamps passing through the squib element.

FIG. 2 shows circuit elements used in the present invention for testing both 1) squib leakage, and 2) high-side and low-side driver performance. A voltage regulator 32 nominally provides an intermediate voltage to squib terminal 26 (although it could alternatively be connected to squib terminal 28). In a preferred embodiment, the intermediate voltage is ½ $V_{batt}$. Regulator 32 has a very limited (i.e., weak) current capacity so that it can only keep the voltage on squib terminal 26 at ½ $V_{batt}$ if nothing else in the circuit is pulling squib terminal 26 to ground, battery voltage, or some other voltage. The maximum current from regulator 32 is insufficient to ignite the squib element.

The voltage present at squib terminal 26 (or alternatively terminal 28) is compared to a predetermined voltage range (which includes the nominal voltage from regulator 32) by a detector 33 comprising a comparator 34, a comparator 35, and an OR-function 36. Terminal 26 is connected to the inverting input of comparator 34 and to the noninverting input of comparator 35. The noninverting input of comparator 34 is connected to a first reference voltage, equal to about ¼ $V_{batt}$ in this preferred embodiment. The inverting input of comparator 35 is connected to a second reference voltage, equal to about ¾ $V_{batt}$ in this preferred embodiment. The outputs of comparators 34 and 35 are connected to respective inputs of OR-function 36. The output of OR-function 36 provides a Leak signal. Detector 33 establishes a predetermined voltage range from ¼ $V_{batt}$ to ⅓ $V_{batt}$. During a squib leakage test, regulator 32 is turned on and if the voltage appearing at squib terminal 26 stays at about ½ $V_{batt}$ then the outputs of comparators 34 and 35 stay at a low logic level. Because of the low logic level input signals to OR-function 36, the Leak signal stays at a low logic level, thereby indicating that there is no squib leakage (e.g., no shorts to ground or to battery). If the voltage is either pulled high (i.e., over ¾ $V_{batt}$) or low (i.e., under ¼ $V_{batt}$) outside the predetermined range, then one of the comparator outputs switches to a high logic level and the Leak signal also goes high, thereby indicating a squib leakage fault. The Leak signal is sent to the microcontroller which keeps track of specific fault occurrences and generates a fault indication, such as turning on a malfunction-indicator light.

The present invention makes use of voltage regulator 32 and the Leak signal to perform high-side driver and low-side driver testing, provided that the squib resistance and squib leakage tests are passed. If these tests are not passed then 1) the risk of an inadvertent deployment being caused when just one of the switches is closed would be increased, and 2) a driver test would have little incremental value since the deployment loop will already be faulted.

Assuming the resistance and leakage tests are passed, then voltage regulator 32 is turned on (if not already on) and one driver is turned on to test it. If the switch logic and MOSFET perform as intended, then squib terminal 26 will have a path either to $V_{deploy}$ or to ground which overcomes the ability of regulator 32 to keep the terminal at ½ $V_{batt}$. Consequently, the Leak signal will go to a high logic level to indicate proper functioning of the respective driver.

Figure 3:
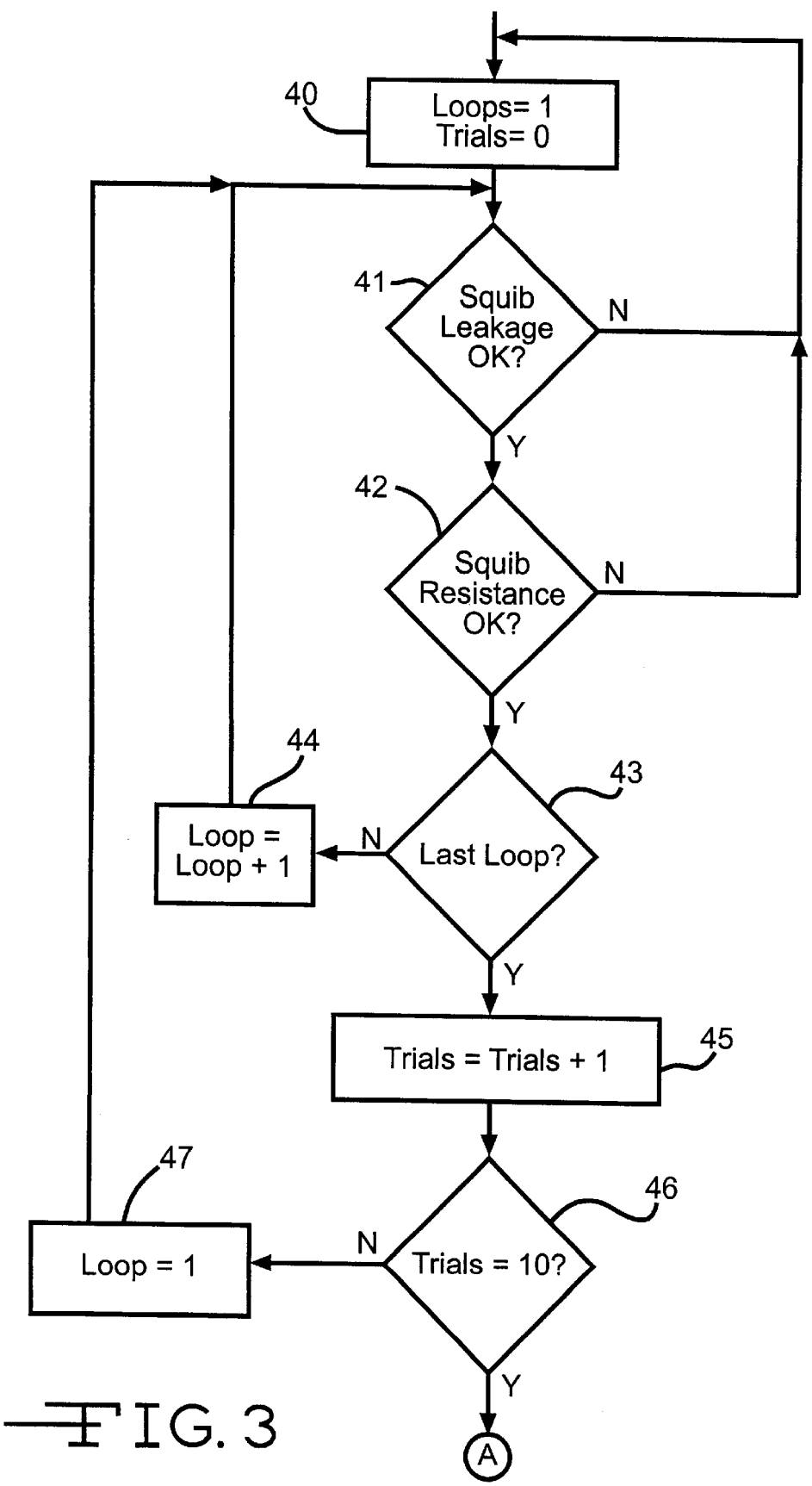
FIG. 3 is a flowchart showing a preferred method of determining that certain conditions are not present that would prevent a high-side and a low-side driver test.
Figure 4:
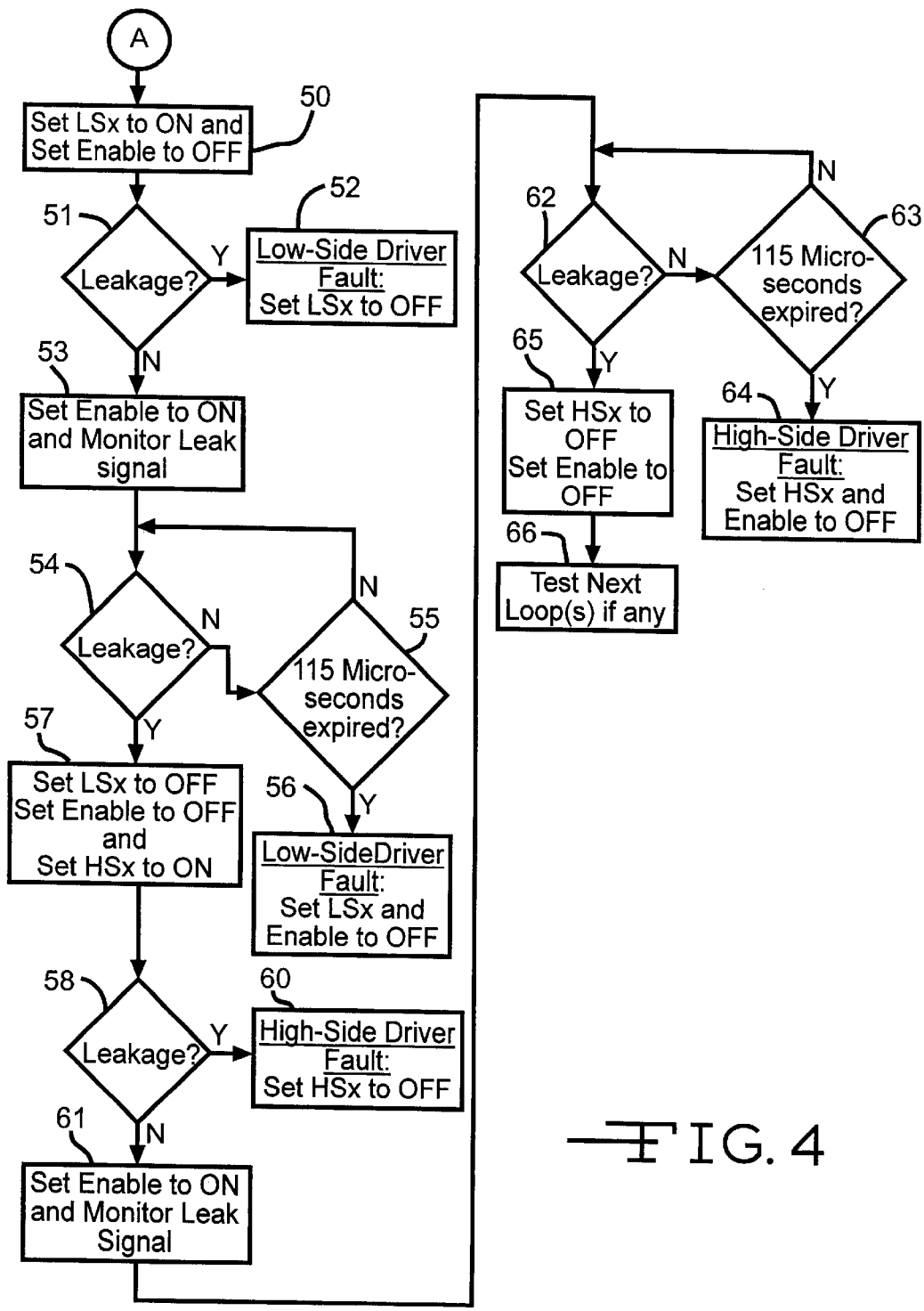
FIG. 4 is a flowchart of a preferred embodiment of the driver test of the present invention.

To most effectively limit the possibility of inadvertent airbag deployment during a driver test, the present invention utilizes the overall method shown in FIGS. 3 and 4.

Preliminary to the actual driver tests, the present invention tests all deployment loops in use on an ASIC for proper squib resistance and absence of squib leakage. For high reliability, these tests are conducted a plurality of times (e.g., 10 times) for each deployment loop in a round-robin fashion. If at any time, a resistance test or a leakage test indicates a fault, then the 10 testing rounds are re-started. This re-starting continues indefinitely until 10 consecutive rounds of resistance and leakage tests are passed for all deployment loops.

In step 40, an index "Loop" for keeping track of a deployment loop being tested is initialized to one and an index "Trial" for keeping track of successful testing rounds is initialized to zero. In step 41, a squib leakage test is performed for the current deployment loop identified by index Loop (e.g., loop 1 for the first execution of step 41). If leakage is detected (i.e., the test is failed) then a return is made to step 40 to begin a new attempt to make it through 10 rounds of tests without a failure. If the leakage test is passed, then the resistance of the squib element in the current deployment loop identified by index Loop is measured in step 42 and compared to its permissible values. If the squib resistance fails the test, the method returns to step 40. If the resistance test is passed, then a check is made in step 43 to determine whether Loop equals the number of loops being used in the ASIC (i.e., whether the last loop has been tested). If not, then Loop is incremented by 1 in step 44 and a return is made to step 41. If the current loop was the last loop, then the index Trials is incremented by one in step 45. A check is made in step 46 to determine if Trials equals 10 (i.e., if 10 consecutive successful round-robin test trials have been completed). If not, then Loop is reset to 1 in step 47 and a return is made to step 41. Otherwise, the method progresses to the driver test phase via a point A.

Specific driver testing of a preferred embodiment is shown in FIG. 4 for one deployment loop. The low-side driver is tested first. In step 50, the LSx ON signal goes high in response to an SPI command from the microcontroller while the Enable signal remains or is set to OFF (i.e., logic low). If the AND-function logic element is functioning properly then there should be no change in the state of the low-side switch. A check is made in step 51 to determine if the Leak signal goes high during a predetermined delay period (preferably equal to about 1 millisecond, for example). If it did, then a low-side driver fault is indicated in step 52 and the LSx ON signal is reset to a low level.

If the Leak signal stayed low in step 51, then the Enable signal is turned on by the microcontroller in step 53, a time counter is started, and the microcontroller begins to continuously monitor the Leak signal for a transition to a high logic level. An important goal of the present invention is to minimize the amount of time that a driver switch is turned on. Therefore, the microcontroller repeatedly and rapidly inspects the Leak signal. If a particular inspection determines that the Leak signal has not gone high, then a check is made in step 55 to determine whether the time counter has reached a predetermined time period (preferably equal to about 115 microseconds, for example). A properly operating driver would normally trigger the leak detector circuit in less than about 50 microseconds, but to allow for process variations, capacitance on a squib line, or other factors, a time period of 115 microseconds is allowed. If 115 microseconds have not yet expired, then a return is made to step 54. If 115 microseconds have elapsed, then a low-side driver fault is indicated in step 56 and the LSx ON signal and the Enable signal are reset to OFF.

As soon as a Leak signal having gone to a high logic level is detected in step 54, the microcontroller immediately takes the Enable signal to its unasserted (i.e., OFF) level in step 57. This turns off the low-side driver and removes ground from the squib terminal. At this point, the low-side driver has passed the driver test and the LSx ON signal is changed to low via an SPI command.

Also in step 57, the HSx ON signal is changed to high via an SPI command in order to initiate testing of the high-side driver. The Leak signal is inspected by the microcontroller in step 58 to verify no turning on of the high-side switch without the Enable signal being asserted. If the Leak signal is detected then a high-side driver fault is indicated in step 60 and the HSx ON signal is reset low.

If no Leak signal is detected in step 60, then the high-side driver is turned on and tested in steps 61–64 in the same manner as the low-side driver. If proper driver operation is detected in step 62, then the Enable signal and the HSx ON signal are reset to OFF and the weak voltage regulator is turned off in step 65. Any remaining high-side and low-side drivers to be tested in other loops are then tested in step 66 in the same manner. Thereafter, normal operation of the ASIC proceeds.

The present invention achieves a variable turn-on time for each driver. In other words, a driver is on only for as long as necessary to verify its proper operation. The transition of the Leak signal initiates the turning off of the corresponding driver. Therefore, any application of current to a corresponding squib is kept as short as possible. Furthermore, the requirement for a plurality of consecutive successful resistance and leakage tests increases the likelihood of being able to conduct a driver test without an inadvertent airbag deployment.

What is claimed is:

1. A method of testing a high-side driver and a low-side driver in an airbag squib circuit, said airbag squib circuit including a squib element coupled between said high-side driver and said low-side driver, said high-side driver controllably providing a high-side voltage to one side of said squib element and said low-side driver controllably providing a low-side voltage to the other side of said squib element, said method comprising the steps of:

testing a resistance of said squib element for a resistance value within a predetermined resistance range;

testing for a current leakage associated with said squib element;

if said resistance and current leakage tests are passed, then supplying an intermediate voltage from a weak power supply to a point in said airbag squib circuit between said high-side driver and said low-side driver;

turning on one of said drivers while keeping the other one of said drivers off;

continuously comparing a voltage at said point with a predetermined voltage range including said intermediate voltage;

turning off said one driver in response to said voltage at said point being outside said predetermined voltage range, thereby detecting that said one driver is operating properly;

if said voltage at said point remains in said predetermined voltage range for a predetermined time period, then turning off said one driver and indicating that said one driver has failed;

turning on said other driver while keeping said one driver off;

continuously comparing a voltage at said point with said predetermined voltage range;

turning off said other driver in response to said voltage at said point being outside said predetermined voltage range, thereby detecting that said other driver is operating properly;

if said voltage at said point remains in said predetermined voltage range for said predetermined time period, then turning off said other driver and indicating that said other driver has failed.

2. The method of claim 1 further comprising the step of:

repeating said current leakage testing for a plurality of trials until a predetermined number of consecutive trials show an absence of current leakage over said leakage threshold, wherein said high-side driver and said low-side driver are only tested if said predetermined number is obtained.

3. The method of claim 1 further comprising the step of:

repeating said resistance testing for a plurality of trials until a predetermined number of consecutive trials show a resistance value within said predetermined resistance range, wherein said high-side driver and said low-side driver are only tested if said predetermined number is obtained.

4. The method of claim 1 wherein said intermediate voltage is substantially equal to one-half of said high-side voltage, wherein said predetermined range is from about one-fourth of said high-side voltage to about three-fourths of said high-side voltage, and wherein said low-side voltage is substantially equal to ground.

5. The method of claim 1 wherein said predetermined time period is substantially equal to about 115 microseconds.

6. Apparatus for firing an airbag squib comprising:

a high-side voltage supply terminal for coupling to a high-side voltage;

a high-side semiconductor switch having an input terminal and a pair of output terminals, one of said output terminals being coupled to said high-side voltage supply terminal and the other of said output terminals being coupled to a first squib terminal;

a ground terminal for coupling to ground;

a low-side semiconductor switch having an input terminal and a pair of output terminals, one of said output terminals being coupled to said ground terminal and the other of said output terminals being coupled to a second squib terminal;

a first logic element having first and second inputs and an output, said output coupled to said input terminal of said high-side semiconductor switch, said first input receiving an enable signal and said second input receiving a high-side activate signal;

a second logic element having first and second inputs and an output, said output coupled to said input terminal of said low-side semiconductor switch, said first input receiving said enable signal and said second input receiving a low-side activate signal;

a voltage regulator coupled to one of said first or second squib terminals, said voltage regulator providing a current-limited power supply having a nominal voltage which is intermediate of said high-side voltage and said ground;

a voltage detector coupled to a selected one of said first or second squib terminals for detecting whether a resultant voltage on said selected squib terminal is within a predetermined voltage range including said nominal voltage; and a controller for 1) activating said voltage regulator, 2) generating said enable signal and said high-side activate signal to turn on said high-side semiconductor switch while keeping said low-side semiconductor switch turned off, 3) continuously monitoring said resultant voltage using said voltage detector, 4) ceasing said enable signal or said high-side activate signal to turn off said high-side semiconductor switch in response to said resultant voltage being outside said predetermined voltage range, thereby detecting that said high-side semiconductor switch and said first logic element are operating properly, and 5) if said resultant voltage remains in said predetermined voltage range for a predetermined time period, then ceasing said enable signal or said high-side activate signal to turn-off said high-side semiconductor switch and indicating a failure.

7. The apparatus of claim 6 wherein said controller is further adapted for 1) generating said enable signal and said low-side activate signal to turn on said low-side semiconductor switch while keeping said high-side semiconductor switch turned off, 2) continuously monitoring said resultant voltage using said voltage detector, 3) ceasing said enable signal or said low-side activate signal to turn off said low-side semiconductor switch in response to said resultant voltage being outside said predetermined voltage range, thereby detecting that said low-side semiconductor switch and said second logic element are operating properly, and 4) if said resultant voltage remains in said predetermined voltage range for a predetermined time period, then ceasing said enable signal or said low-side activate signal to turn-off said low-side semiconductor switch and indicating a failure.

8. The apparatus of claim 6 wherein said controller is further adapted to perform a leakage test wherein said controller 1) activates said voltage regulator, 2) checks that said resultant voltage remains within said predetermined voltage range, and 3) repeats item 2 until said resultant voltage stays within said predetermined voltage range for a consecutive, predetermined number of trials.

9. The apparatus of claim 6 wherein said controller is further adapted to perform a squib resistance test wherein said controller 1) checks that a resistance of said squib element remains within a predetermined resistance range, and 2) repeating item 1 until said resistance is within said predetermined voltage range for a consecutive, predetermined number of trials.

10. The apparatus of claim 6 wherein said first and second logic elements are comprised of AND-functions.

11. The apparatus of claim 6 wherein said nominal voltage is substantially equal to one-half of said high-side voltage.

12. The apparatus of claim 6 wherein said predetermined time period is substantially equal to about 115 microseconds.

* * * * *